United States Patent [19]

Dewey et al.

[11] 4,275,395

[45] Jun. 23, 1981

[54] INTERACTIVE PROJECTION DISPLAY SYSTEM

[75] Inventors: Anthony G. Dewey; Glenn T. Sincerbox, both of San Jose, Calif.

[73] Assignee: International Business Machines Corporation, Armonk, N.Y.

[21] Appl. No.: 79,776

[22] Filed: Sep. 28, 1979

Related U.S. Application Data

[63] Continuation of Ser. No. 847,332, Oct. 31, 1977, abandoned.

[51] Int. Cl.$^3$ ............................................. G06F 3/14
[52] U.S. Cl. .................................. 340/706; 340/707;
340/783; 33/1 M; 178/18
[58] Field of Search ............... 340/707, 709, 783, 763;
178/18–20; 353/42; 358/58; 33/1 M

[56] References Cited

U.S. PATENT DOCUMENTS

| | | | |
|---|---|---|---|
| 3,399,401 | 8/1968 | Ellis et al. ............................ 340/710 |
| 3,692,936 | 9/1972 | Moffitt .................................. 178/18 |
| 3,775,005 | 11/1973 | Szabo .................................... 353/42 |
| 3,821,796 | 6/1974 | Ernstoff et al. ...................... 358/58 |
| 3,825,730 | 7/1974 | Worthington, Jr. et al. ........ 340/700 |
| 3,883,861 | 5/1975 | Heartz ................................. 340/709 |
| 3,932,862 | 1/1976 | Graven ................................ 178/18 |
| 4,020,281 | 4/1977 | Davis, Jr. ............................ 178/18 |
| 4,071,690 | 1/1978 | Joannu ................................ 178/18 |

*Primary Examiner*—Marshall M. Curtis
*Attorney, Agent, or Firm*—Joseph E. Kieninger

[57] ABSTRACT

An interactive projection display system having a light pen device for use thereon is described. The projection display system has an image of a light valve on a projection screen which is formed by visible light of specified wavelengths. The projection screen also has a translatable crosswire image thereon which is formed by radiation which includes the visible light used to form the light valve image and an additional spectral component. The light pen device is sensitive to this additional spectral component. In a preferred embodiment, the image of the light valve and the crosswires are formed with white light (0.3 to 0.7 microns). The additional spectral component used for the crosswire image and the light pen sensing is a band of near-IR radiation (0.7 to 1 micron).

9 Claims, 7 Drawing Figures

INTERACTIVE PROJECTION DISPLAY SYSTEM

This is a continuation of application Ser. No. 847,332 filed Oct. 31, 1977 now abandoned.

FIELD OF THE INVENTION

This invention relates to interactive projection display systems and more particularly to a system suitable for having a light pen device used therewith.

DESCRIPTION OF THE PRIOR ART

Some projection display systems are interactive, that is, they permit operator selection of control options from a large library of available options. Interactive projection display systems generally employ a selection means and/or a position indicator. A keyboard, control lever or a stylus-type device, for example a light pen, are commonly used selector means. A cursor is an example of a position indicator.

An interactive projection display system using a light pen device is described in the patent to Worthington et al, U.S. Pat. No. 3,825,730. This two-way projection system selects desired input messages from a library of selectable messages by locating the position of the light emitting light pen with an array of photodetectors. This system is limited to operation in a read only mode as well as to a fixed number of options which is determined by the number of detectors in the array.

The stylus function for use as a graphic input is described in the patent to Ellis et al, U.S. Pat. No. 3,399,401 where the user interacts directly with a tablet separate and distinct from the display screen. Since the system does not deal directly with the display screen, it needs to correlate the tablet with the display screen.

The cursor function in a data input generator is described in the patent to Heartz, U.S. Pat. No. 3,883,861 and is used for encoding information in a digital form to produce a data base descriptive of a land mass or the like. This system does not utilize a light pen function and requires a beamsplitter which would prohibit the use of a light pen function which would touch the screen.

Stylus devices which are used to indicate coordinates directly on the display screen fall into two basic categories. The first type acts independently of the image on the screen such as the acoustic stylus device described in U.S. Pat. No. 3,692,936 (Moffitt Sept. 19, 1972). The second type, of which the CRT light pen is the most common example, uses a photoresponsive stylus which senses the photo emission from the display screen. The coordinates of the light pen are determined from timing information using the fact that the screen image is being refreshed (periodically rewritten) at a rapid rate. This basic light pen system has two limitations: it cannot operate with a storage type or long persistence display, and it can only detect in luminous areas of the screen. The first limitation is circumvented by the patent to Davis, U.S. Pat. No. 4,020,281 in which a storage display is partially erased and rewritten during the light pen operation. The second limitation is circumvented by several means which employ the writing of a special luminous pattern on the screen during the light pen operation, as referenced in the aforementioned Davis patent.

SUMMARY OF THE INVENTION

It is a primary object of this invention to provide an improved interactive projection display system.

It is another object of this invention to provide means for interacting with the projected image upon a screen.

It is still another object of this invention to provide an interactive projection display system having a light pen function which is not restricted to predetermined portions of the display field.

It is still another object of this invention to provide an interactive projection display system having a light pen function which can detect on both written and unwritten portions of the display field.

It is yet still another object of this invention to provide an interactive projection display system having a light pen function which interacts directly with the projection screen.

It is a further object of this invention to provide an interactive projection display system having both a light pen function and a cursor function.

These and other objects are accomplished by an interactive projection display system which has an image of a light valve on a projection screen formed by visible light of specified wavelengths, and which has a translatable crosswire image on the projection screen formed by radiation which includes the visible light used to form the light valve image and an additional spectral component. This additional spectral component is an arbitrary wavelength band, and is preferably generated by the projection lamp. The system also has a light pen device sensitive to this additional spectral component which when used in conjunction with a translatable crosswire image senses the light pen position on the screen. In a preferred embodiment, the image of the light valve and the crosswires are formed with white light (0.3 to 0.7 microns). The additional spectral component used for the crosswire image and the light pen sensing is a band of near-IR radiation (0.7 to 1 micron). The cursor function is provided by the visible image of the crosswires on the projection screen. The intersection of the images of the two wires indicates the reference coordinates on the screen. In the light pen mode, the horizontal and vertical images of the cursor wires are translated rapidly across the screen in succession. The light pen device when activated in a conventional manner detects the passage of the image of the wires formed in the near IR band. The position of the light pen is determined by knowledge of the position of the cursor wires at the time the images are detected.

Other objects of this invention will be apparent from the following detailed description, reference being made to the accompanying drawings wherein various embodiments of the invention are shown.

DESCRIPTION OF THE ILLUSTRATIVE EMBODIMENTS

Figure 1:
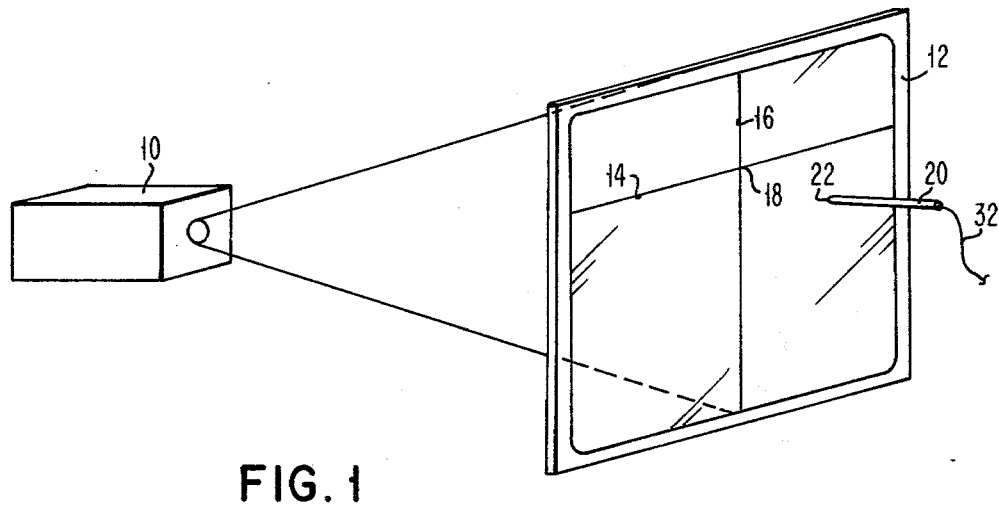
FIG. 1 is a schematic view of the interactive projection display system of this invention.

This invention deals with an interactive projection display system as shown in FIG. 1. The interactive system has a projection system 10 which projects an image from a light valve (not shown) on a rear projection screen 12. On the screen 12 are images 14 and 16 of the cursor wires which intersect each other at point 18 as the crosswire image to indicate the reference coordinates on the screen 12 and thereby provide the cursor function. A light pen 20 has an end 22 which interacts directly with the projection screen 20. During operation of the light pen 20, the images 14 and 16 of the cursor wires are translated rapidly across the screen 12 in succession. Activation of the light pen 20 in a conventional manner detects the passage of the image 14 and 16 of the cursor wires by the light pen device being sensitive to the additional spectral component which is used to form the cursor wire images 14 and 16 as will hereinafter be more fully discussed. The position of the light pen end 22 on the screen 12 is determined by knowledge of the position of the cursor wire images 14 and 16 at the time the images 14 and 16 are intercepted as will hereinafter be more fully discussed.

The cursor wires will be opaque to the radiation and hence their images 14 and 16 on the screen will always be black. The light valve (LV) may be either subtractive or additive. With a subtractive LV, the screen will normally be luminous and written areas of the image will be darker. With an additive LV, the screen will normally be dark and written areas of the image will be luminous. In either case, the dark areas of the screen image will not be black because of the limited contrast ratio of the image.

Thus, the crosswire image 18 will be visible at all points of the screen and in principle it could be detected by a light pen device 20 sensitive to the visible spectrum. However, the signal level would vary widely from dark to luminous areas of the screen, and hence it is preferable to flood the cursor wires uniformly with an additional spectral component which is distinct from the visible light used to form the image of the LV.

Figure 2:
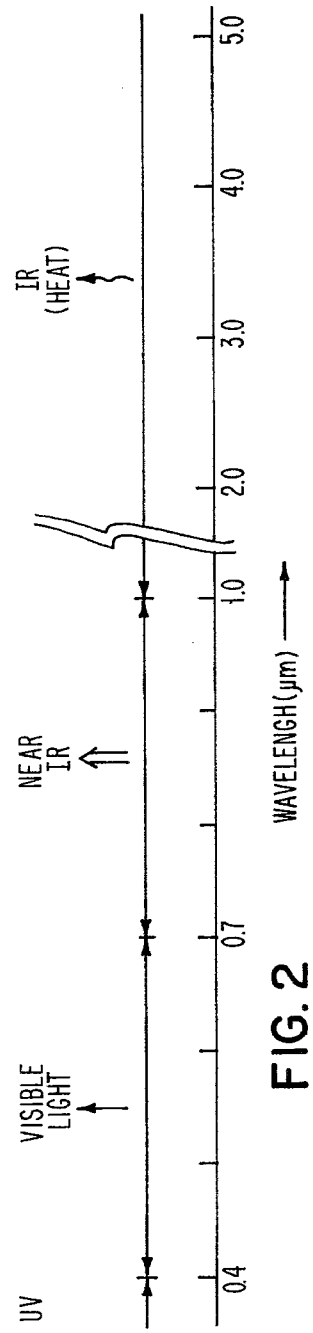
FIG. 2 illustrates a typical light spectrum for a projection lamp utilized in this invention.

The light or radiation output from the projection system 10 is critical for the successful operation of the cursor wire images and the light pen device and can be more readily understood by describing the radiation in the framework set forth in FIG. 2. Typically, a lamp of the type used in projection display systems has an output which covers the spectrum shown in FIG. 2, that is, it has UV light having wavelengths less than 0.4 microns, visible light in the range of 0.4 to 0.7 microns, near-IR light having a wavelength between 0.7 and about 2.0 microns and IR radiation or heat having a wavelength greater than about 2 microns. In general, the image in the projection display system on the screen is formed with the visible light. This visible light is also used to form the image of the cursor wires. In addition, the crosswire image contains an additional spectral component. In the preferred embodiment, this additional spectral component is in the near-IR wavelength, that is, between 0.7 and 1.0 microns. The light pen device is only sensitive to this additional spectral component.

It should be recognized that the additional spectral component is not limited to the near IR band, but could be among other things a band of visible light, for example, red light. The LV image could be formed with the remainder of the visible spectrum, namely, cyan light. Dark areas of the LV image would appear red and light areas would be white. The light pen would be made sensitive to red light only.

Figure 3:
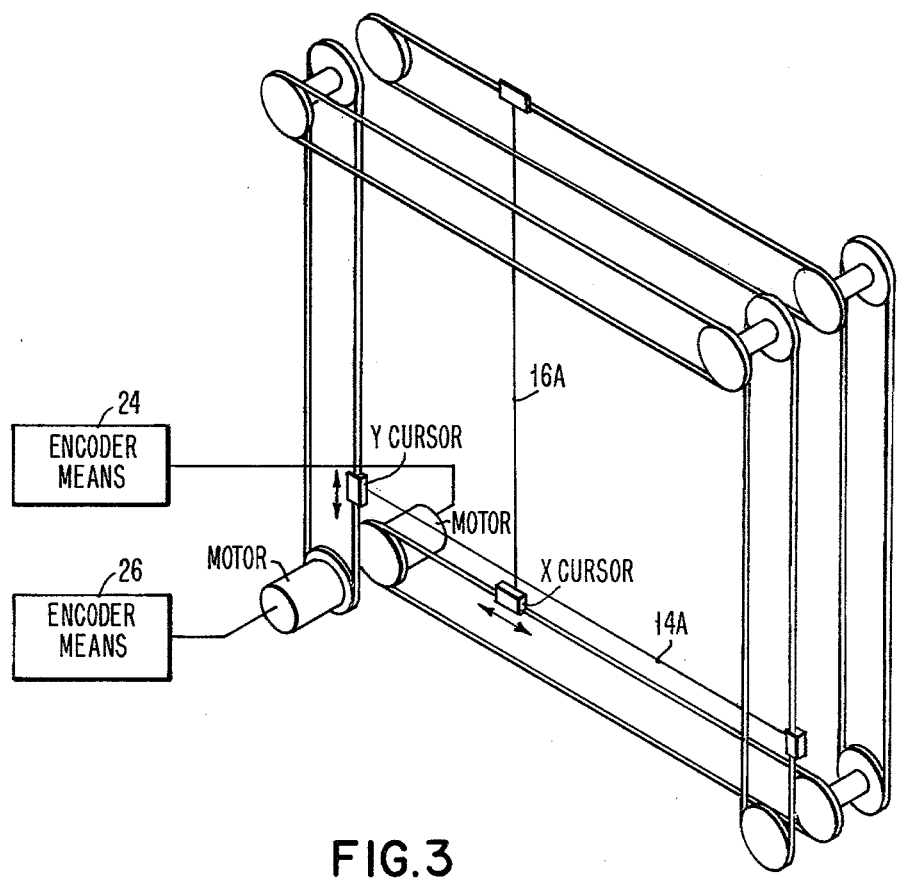
FIG. 3 is a top view of the cursor arrangement.

As shown in FIG. 3, the X-cursor is a wire 16A which is connected to motor and encoder means 24. The Y-cursor is a wire 14A which is connected to motor and encoder means 26. The mechanical and electromechanical operation of the X and Y-cursor wires is performed in a conventional manner and other alternative means may be used if desired. The image of the X-cursor wire moves across the screen from left to right or right to left. The image of the Y-cursor wire moves across the screen from top to bottom or bottom to top.

Figure 4:
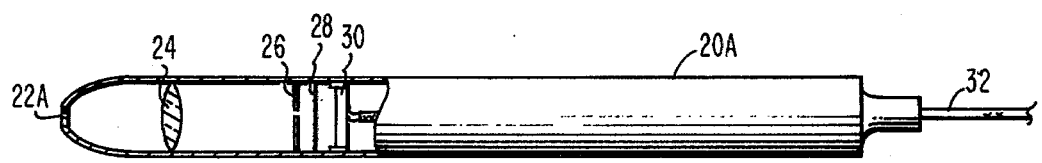
FIG. 4 is a cross-sectional view of the light pen device.
Figure 5:
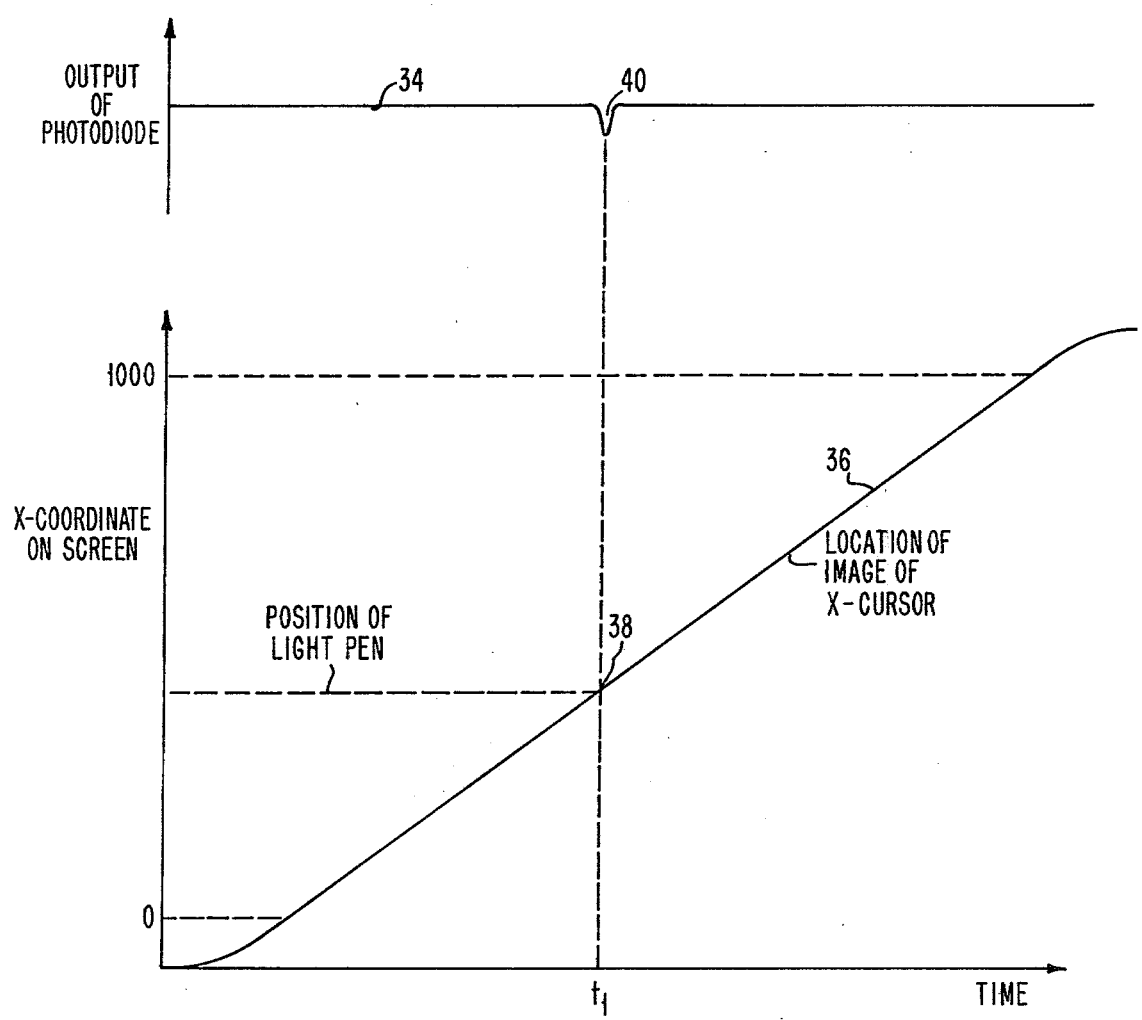
FIG. 5 illustrates the interaction of the light pen and the cursor function.

An enlarged view of the light pen 20A is shown in FIG. 4. The light pen 20A has an end 22A which is positioned directly on the projection screen. When the light pen end 22A is placed on the screen, the lens 24 images a small area of the screen onto the aperture 26. As the image of the X-cursor crosswire crosses this area, and passes through filter 28, the output of the photodiode 30 will momentarily dip as shown in FIG. 5. Using the known position of the X-cursor at this instant ($T_1$) (from a shaft encoder or by using a stepping motor as is well known in the art), the X-coordinate of the light pen can be found. Immediately following $T_1$, the Y-cursor can be made to move in order to determine the Y-coordinate of the light pen.

The essential characteristics of the light pen 20A is that the photodiode 30 is responsive to the additional spectral component which is used to form the translatable crosswire image on the projection screen. The preferred additional spectral component is in the near IR spectrum portion, that is, between 0.7 microns and 1.0 microns.

The interaction between the light pen and the cursor wire image is more easily understood by a discussion about FIG. 5. In FIG. 5, the upper curve 34 shows the output of the photodiode and the lower curve 36 shows the position of the image of the X-cursor as a function of time. The position information is provided by a shaft encoder on the motor which drives the X-cursor, or by timing information, or by similar means. When the image of the X-cursor crosses the position of the light pen at 38, the output 40 of the photodiode will momentarily drop. The known position of the X-cursor at this time ($T_1$) is the X-coordinate of the light pen.

Similarly, a subsequent and similar operation of the Y-cursor will provide the Y-coordinate of the light pen.

Figure 6:
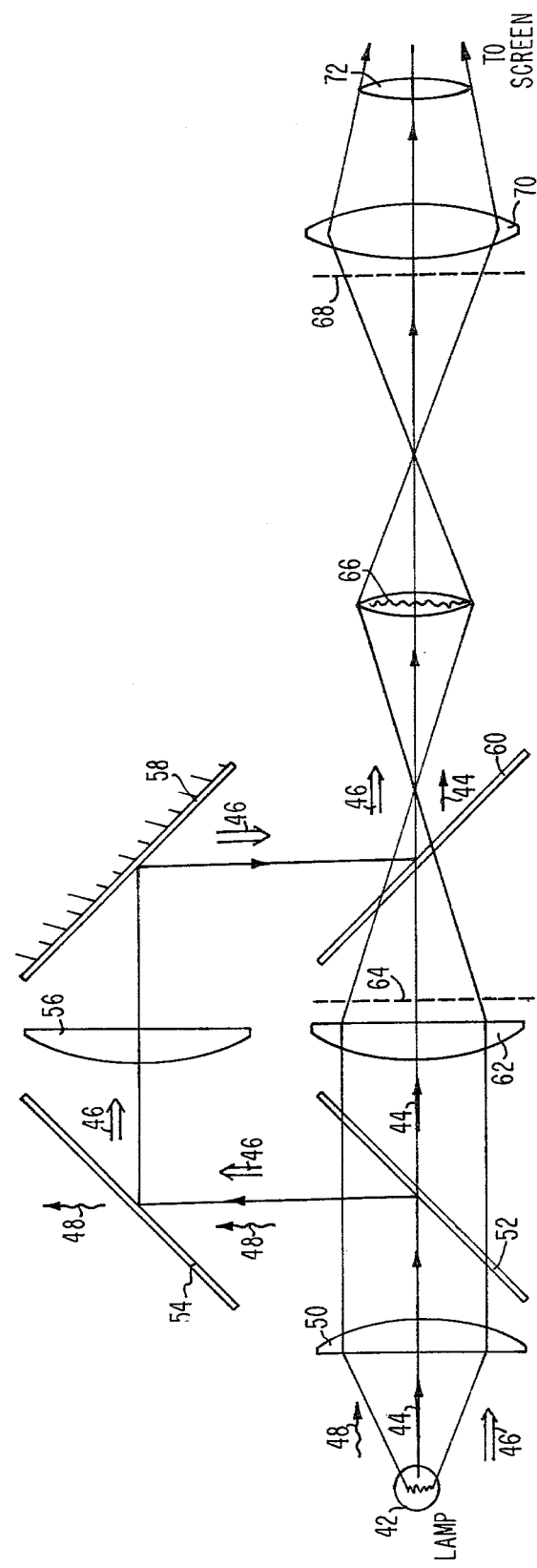
FIG. 6 is a schematic view of the interactive display system in accordance with this invention.

A preferred embodiment for a transmissive LV is shown in FIG. 6. A projection lamp 42 having visible light 44 represented by an arrow with a single line, near-IR radiation 46 represented by an arrow with a double line, and IR radiation 48 represented by an arrow with a wavy line. The radiation 44, 46, and 48 is collimated by the condenser lens 50. The collimated radiation is directed to hot mirror 52 which transmits the visible light 44 and reflects the IR radiation 46 and the near-IR 48. Radiation 46 and 48 is directed to a special cold mirror 54 which transmits the IR radiation 48 and reflects the near-IR radiation 46 to a condenser lens 56. The near-IR radiation 46 is reflected off of a folding mirror 58 to a hot mirror 60. The visible light 44 which is passed through the hot mirror 52 passes through a condenser lens 62 and a light valve which is located in plane 64. The visible light then passes through hot mirror 60 and continues along with the near IR radiation 46 to relay lens 66 which relays an image of light valve in plane 64 into the plane of the cursor wires located at 68. The light then proceeds through a field lens 70 which images the aperture of the relay lens 66 into the aperture of the projection lens 72. The projection lens 72 images plane 68 onto a screen (not shown.) Hence, the screen displays an image of the LV whose image was relayed into plane 68 and also an image of the cursor wires which are located in plane 68.

The preferred embodiment described above in FIG. 6 utilizes the near-IR radiation as the spectral component which passes through the plane 68 to form an image of the cursor wires on a screen which is subsequently sensed by a light pen sensitive to the near IR radiation.

It is understood that numerous variations of the embodiments shown in FIG. 6 can be used. For example, the mirror 60 may also be used for directing on to the LV 64 a near-IR laser, such as Nd:YAG for the purpose of writing on the LV. It is also understood that instead of using a portion of the lamp spectrum for the near-IR, a separate narrow bandwidth source could be used. For example, the special cold mirror 54 could be removed and a GaAs IR diode could be put in its place.

Figure 7:
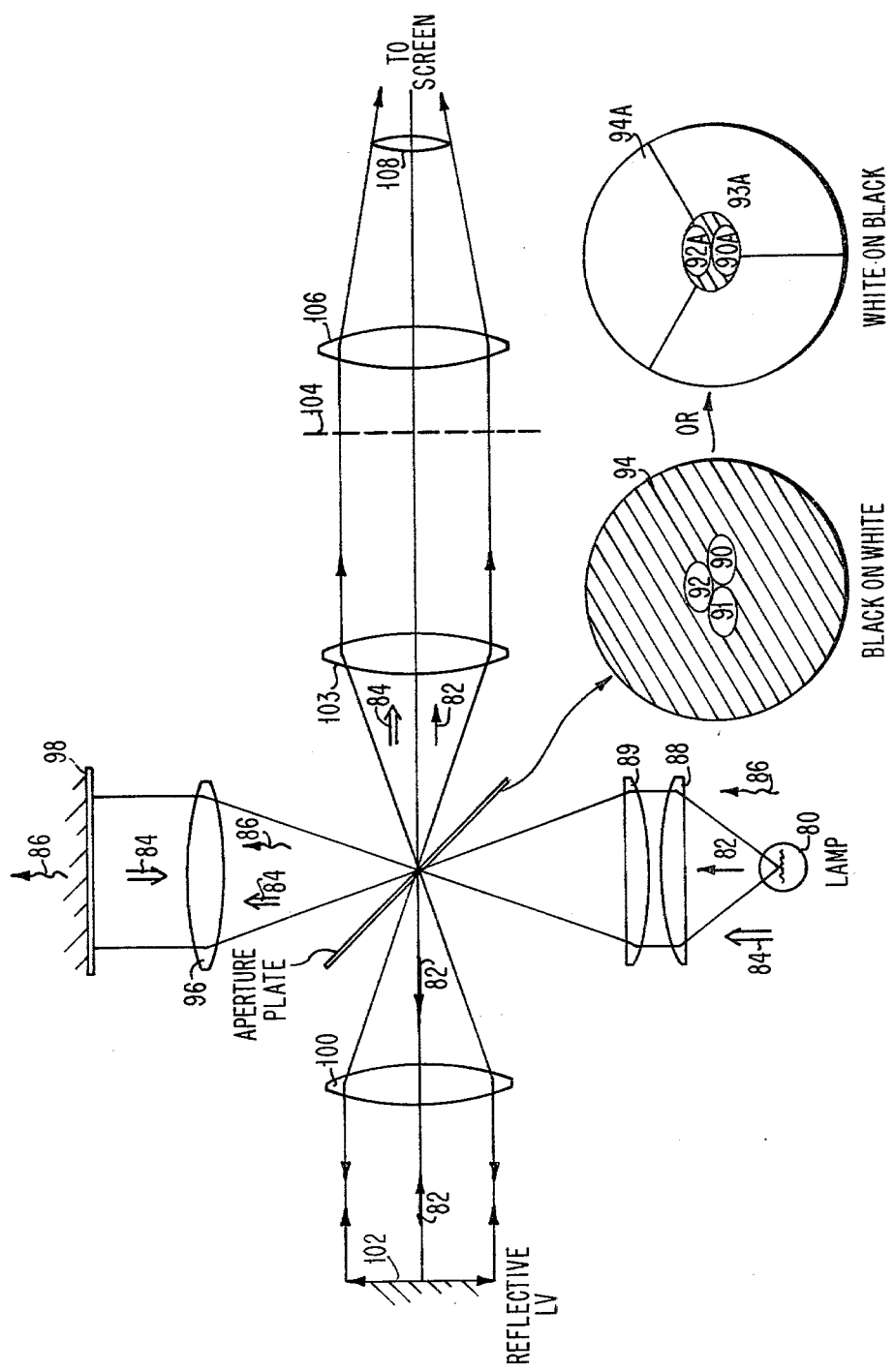
FIG. 7 is a schematic of a second embodiment of this invention.

Another embodiment suitable for a reflective LV is shown in FIG. 7. A lamp 80 transmits visible light 82, near IR radiation 84 and IR radiation 86 through a condenser lens 88 which collimates the light from the lamp 80. The light passes through the condenser lens 89 and forms an image of the lamp filament on an elliptical mirror 90 on the aperture plate 94. The elliptical mirror 90 reflects visible light but transmits IR and near-IR radiation. The aperture plate 94 contains an aperture 91 and a front surface mirror 92 on the opposite side of the aperture plate to elliptical mirror 90. Aperture plate 94 is suitable for a subtractive LV. Alternatively, aperture plate 94A is for an additive LV and has an elliptical mirror 90A, a front surface mirror 92A on the opposite side of the aperture plate to 90A and an opaque stop 93A. The near IR radiation 84 and the IR radiation 86 which passes through the elliptical mirror 90A continues and passes through condenser lens 96 to a special cold mirror 98 which transmits the IR heat 86 but reflects the near IR radiation 84. The rear IR radiation 84 that is reflected by the mirror 98 passes through the condenser lens 96 and forms am image of the lamp filament on mirror 92A.

The visible light 82 is reflected by mirror 90 (90A) and passes through a telecentric schlieren lens 100 to a reflective light valve 102. The reflective light valve 82 reflects visible light 82 through the lens 100 to the aperture 91 on aperture plate 94 (or around the opaque stop 93A on aperture plate 94). The visible light 82 and the near IR radiation 84 passes through relay lens 103 which along with lens 100 forms an image of the light valve 102 in plane 104, the location of the cursor wires. Field lens 106 images the aperture of relay lens 103 into the aperture of projection lens 108 which images plane 104 onto a screen not shown.

It is understood that the invention could be utilized with an image from a CRT or similar photoemissive display element when used in a projection display mode.

This invention is particularly useful for projection systems employing a reflective liquid crystal light valve.

Although some preferred embodiments of this invention have been described, it is understood that numerous variations may be made in accordance with the principles of this invention.

What is claimed is:

1. An interactive projection display system comprising:
    a projection screen;
    means including a light valve to provide on said screen a visible image of light rays with wavelengths within one band,
    cursor means comprising first and second wires that are intersectable and independently translatable to provide on said screen a movable image of light rays with wavelengths within a different band and distinguishable from said visible image;
    sensing means comprising a light pen device for detecting radiation in said different band and positionable on said screen at any one of a plurality of points on said screen, and
    means for effecting a single translation of each wire in different intersecting directions for causing the respective portion of the movable image provided by each wire to move across the screen a single time and be sensed by said sensing means when the image of that respective wire passes through the point at which the light pen device is positioned, thereby providing a feedback signal to said system for determining the coordinate position of the light pen device.

2. A display system as described in claim 1 wherein said translating means moves each wire sequentially.

3. A display system as described in claim 1 wherein the wavelengths of the light rays of said different band are between 0.7 and 1 micron.

4. A display system as described in claim 1 wherein said first mentioned means and cursor means use the same radiation source.

5. A display system as described in claim 1 wherein the coordinate position of the light pen device is determined by the time required for each image to be sensed by said sensing means.

6. A display system as described in claim 1 wherein said one band is substantially contiguous with said different band.

7. A display system as described in claim 1 wherein said first means provide an image of a reflective light valve.

8. A display system as described in claim 1 wherein said first means provide an image of a photoemissive display element.

9. A display system as described in claim 1 wherein said different band includes a spectral component not present in the visible image.

* * * * *